UNITED STATES PATENT OFFICE 2,682,555

1-HYDROXYMETHYL - 1,12 - DIMETHYL-1,2,-3,4,6,7,9,10,11,12,13 - DODECAHYDRO - 7 - PHENANTHRONE AND ESTERS THEREOF

Willard M. Hoehn, Wilmette, Ill., assignor to G. D. Searle & Co., Chicago, Ill., a corporation of Illinois No Drawing. Application January 12, 1953,
Serial No. 330,893

5 Claims. (Cl. 260—476)

The present invention relates to a group of new hydrophenanthrone derivatives and, specifically, to the 1-hydroxymethyl, 1-alkanoyloxymethyl, and the aroyloxymethyl derivatives of 1,12 - dimethyl - 1,2,3,4,5,6,7,9,11,12,13 - dodecahydro-7-phenanthrone which have the structural formula

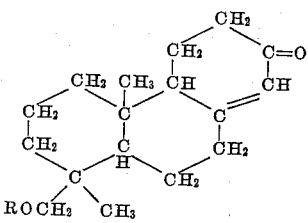

wherein R is either hydrogen or a lower alkanoyl or benzoyl radical.

Among the lower alkanoyl radicals suitable for the purposes of this invention are acetyl, propionyl, butyryl, isobutyryl, pentanoyl, hexanoyl, heptanoyl, octanoyl, cyclopentaneacetyl, cyclohexaneacetyl, and the like.

These compounds are valuable medicinal agents. They exert a regulatory effect on the estrous cycle and stimulate the accessory sex glands in the male. They are also valuable intermediates in organic synthesis. Thus oxidation of the 1-hydroxymethyl group yields the 1,12 - dimethyl - 1,2,3,4,5,6,7,9,10,11,12,13 - dodecahydro-1-formylphenanthrene-7-one.

The $\Delta^8$-7-one structure enables the claimed compositions to undergo a series of condensation reactions typical for $\alpha,\beta$-unsaturated ketones such as formation of enol ethers, acetals, and the like. Reduction of this $\alpha,\beta$-unsaturated ketone grouping yields the 7-hydroxy compound which can be converted to the disodio salt; reaction of the latter with dialkylaminoalkyl halides yields the 7-dialkylaminoalkoxy derivatives. The latter can be quaternized to quaternary ammonium derivatives which have an inhibitory effect on the transmission of autonomic nerve impulses through sympathetic and parasympathetic ganglia.

Reduction of the $\Delta^8$-double bond leaves an active carbonyl group at carbon-7 which undergoes such carbonyl reactions as hydrogen cyanide addition, malonic acid condensation, oxime formation and the like. Reduction of the oxime leads to the amine which, on reaction with dialkylaminoalkyl halides, yields the 7-dialkylaminoalkyl derivatives. Valuable central depressant agents are also obtained by introducing a barbiturate group in the 7-position.

One of the convenient methods for preparing the 1-hydroxymethyl-1,12-dimethyl-1,2,3,4,5,6,7,-9,10,11,12,13 - dodecahydro-7-phenanthrone utilizes the following reactions. Methyl neoabietate is ozonized and then treated with a semicarbazide hydrohalide to form 1-carbomethoxy-1,12-dimethyl - 1,2,3,4,5,6,7,9,10,11,12,13 - dodecahydro-7-phenanthrone semicarbazone. Treatment of the latter with pyruvic acid and sodium acetate in acetic acid to remove the semicarbazone radical and treatment of the free ketone with ethyl orthoformate leads to a compound which is apparently the 1,12-dimethyl-7-ethoxy-1,2,3,4,5,6,-10,11,12,13 - decahydrophenanthrene-1-carboxylic acid methyl ester. Reduction with lithium aluminum hydride converts the 1-carboxymethyl radical of the latter to a hydroxymethyl radical and hydrolysis of the enol ether yields free 7-ketone.

An alternative approach, leading directly to the desired esters, consists in the esterification of neoabietinol

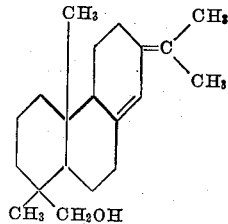

with an acyl halide or benzoyl halide, preferably in the presence of pyridine, and subsequent ozonolysis of the resulting ester to replace the isopropylidine radical by an oxo radical. The esters can be hydrolyzed by conventional methods to the free 1-hydroxymethyl compound.

The following examples illustrate in detail some of the procedures used for practicing this invention and the products produced thereby. However, this invention is not to be construed as limited in spirit or in scope by the details set forth. In these examples temperatures are given in degrees centigrade (° C.) and relative amounts of materials in parts by weight.

*Example 1*

A solution of 100 parts of methyl neoabietate in 1070 parts of dichloromethane is cooled to $-50°$ C. and ozone is passed into the solution. The reaction is stopped when 95% of the calculated amount of ozone has been used. The excess ozone is displaced by oxygen and the dichloromethane solution is transferred to a dropping funnel. The reaction mixture is then dropped slowly into a distilling flask containing 1000 parts of hot water. The flask, fitted with a water-cooled condenser and receiver, is heated on a steam bath. After all the volatile solvent has been distilled, the aqueous mixture is refluxed 25 minutes. The water is then removed by distillation under reduced pressure. A solution of 50 parts of semicarbazide hydrochloride and 50 parts of sodium acetate in 400 parts of 80% aqueous methanol is added and the mixture is refluxed for 2 hours. It is then poured into 3000 parts of cold water and the crude semicarbazone mixture is collected on a suction filter. The product is heated with 400 parts of methanol at gentle reflux for 20 minutes and allowed to cool. The resulting 1-carbomethoxy-1,12-dimethyl-1,2,3,4,-5,6,7,9,10,11,12,13 - dodecahydro-7-phenanthrone semicarbazone, recrystallized from methyl alcohol, melts at about 220-222° C. It has the structural formula

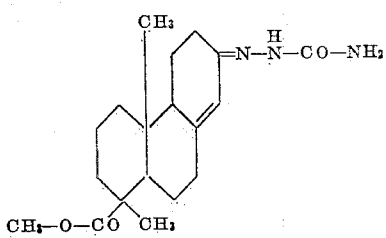

*Example 2*

A solution of 435 parts of 1-carbomethoxy-1,12 - dimethyl - 1,2,3,4,5,6,7,9,10,11,12,13 - dodecahydro-7-phenanthrone semicarbazone in 315 parts of acetic acid is treated with a solution of 35 parts of 50% pyruvic acid and 16 parts of sodium acetate in 85 parts of acetic acid. The resulting solution is heated to reflux for 10 minutes. Then 1000 parts of water are added at such a rate that the reflux temperature is maintained between 105-110° C. for 25 minutes reaction time, at 100-105° C. for the next 15 minutes, and at 95-100° C. for the last 20 minutes. The mixture is then cooled to room temperature and extracted with ether. The ether extract is washed free of acid with dilute sodium hydroxide solution and the alkali is washed out with water. The ether is removed in vacuo and the resulting gum is dried by azeotropic distillation with benzene. The benzene is removed by distillation in vacuo and the resulting gum crystallizes on cooling.

To the solid 1-carbomethoxy-1,12-dimethyl-1,2,3,4,5,6,7,9,10,11,12,13 - dodecahydro - 7 - phenanthrone are added 175 parts of anhydrous dioxane, 4 parts of ethanol and 40 parts of ethyl orthoformate. After all the product has dissolved, 27 parts of dioxane, containing 2.46 parts of concentrated sulfuric acid are added. The mixture turns from a light yellow to a dark red as soon as the addition is complete. After standing for 15 minutes the mixture is treated with 55 parts of pyridine and all solvents are removed in vacuo. The residue is twice treated with methanol which is then removed in vacuo. Similar treatments of the residue are carried out with two 210-part portions of benzene and two 350-part portions of anhydrous ether. The residue is then dissolved in 700 parts of anhydrous ether and dropped into a solution of 15 parts of lithium aluminum hydride in 1100 parts of anhydrous ether. After standing for 12 hours the mixture is refluxed for two hours. The excess reducing agent is destroyed by the addition of 270 parts of ethyl acetate, followed by addition of 400 parts of 50% ethanol and then 250 parts of water. The ether solution is decanted from the inorganic layer and the latter is washed twice with 350-part portions of ether. The ether solution and the washings are transferred to a distillation flask and the ether is removed in vacuo.

The resulting gum is dissolved in 400 parts of methanol. A solution of 20 parts of semicarbazide hydrochloride and 20 parts of sodium acetate in 200 parts of 80% methanol are added. The mixture is evaporated to 2/3 of its original volume and is then diluted with 750 parts of water. The resulting solid is allowed to coagulate and the liquid is decanted. The solid residue is treated with methyl alcohol, which causes most of it to dissolve. The solution is then treated with 1.5 times its volume of ether, whereupon a crystalline solid is obtained. The semicarbazone is recrystallized by dissolving in 100 parts of methanol and adding 140 parts of anhydrous ether. The 1-hydroxymethyl-1,12-dimethyl - 1,2,3,4,5,6,7,9,10,11,12,13 - dodecahydro-7-phenanthrone semicarbazone melts at about 245° C. with decomposition, but solvent appears to be released at about 210° C. It has the structural formula

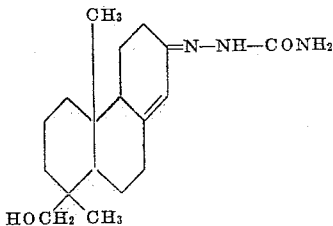

*Example 3*

To a solution of 11.7 parts of the semicarbazone of 1 - hydroxymethyl - 1,12 - dimethyl-1,2,3,4,5,6,7,9,10,11,12,13 - dodecahydro - 7 - phenanthrone in 300 parts of hot acetic acid is added a solution of 12 parts of 50% pyruvic acid and 5.6 parts of sodium acetate in 80 parts of acetic acid. The solution is heated to reflux for 10 minutes. 1000 parts of water are added at such a rate that the reflux temperature is maintained between 105-110° C. for 25 minutes reaction time; 100-105° C. for the next 15 minutes; and 95-100° C. for the last 20 minutes. The mixture is cooled to room temperature and then extracted with ether. The ether extract is washed with dilute sodium hydroxide solution until the washings give a strong alkaline reaction. The alkali is washed out of the ether solution with water.

The ether solution is dried over sodium sulfate, filtered and evaporated in vacuo. The residue is dissolved in a minimum amount of ethyl acetate and applied to a chromatography column containing silica gel which had previously been treated with benzene. No crystalline material is eluted with a solution of 20% ethyl acetate in benzene. Elution with a 30% solution of ethyl acetate in benzene, evaporation of the eluate and recrystallization of the residue from a 2:1 mixture of ether and petroleum ether yields 1 - hydroxymethyl - 1,12 - dimethyl - 1, 2,3,4,5,6,7,9,10,11,12,13 - dodecahydro - 7 - phenanthrone melting at about 109–110.5° C. The specific rotation of a 1% ethanolic solution is about +43.5°. The ultraviolet absorption spectrum shows a maximum at 242.5 millimicrons with a molecular extinction coefficient of 16,200. The infrared spectrum shows maxima at 2.76 and 6.05 microns. This compound has the structural formula

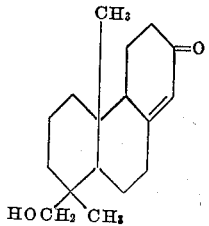

Example 4

A solution of 80 parts of neoabietinol in 245 parts of pyridine is treated with 73 parts of benzoyl chloride. The mixture becomes warm and a crystalline deposit appears. After standing at room temperature for two hours the mixture is diluted with 1400 parts of anhydrous ether. The pyridine is washed out with water and the ether layer is washed with dilute sodium carbonate solution, water, saturated boric acid solution and then again with water. It is then dried over sodium sulfate, filtered and stripped of solvent in vacuo, care being taken not to heat above 40° C. The residual oil is treated with 200 parts of methanol and chilled. An oil forms, which is separated, stirred with 200 parts of methanol and then treated with 160 parts of 2-propanol. This causes a colorless solid to precipitate. The latter is collected on a filter and washed with water. The benzoate of neoabietinol thus obtained melts at about 108–110° C. A 1% methanol solution shows a specific rotation of $[\alpha]^{25}_D = +113°$. The ultraviolet absorption spectrum shows maxima at 235 and 248 millimicrons with molecular extinction coefficients of about 26,200 and 24,000, respectively.

Example 5

A solution of 230 parts of neoabietinol benzoate in 1350 parts of dichloromethane is ozonized in the course of 35 minutes at —50° C. until a sufficient amount of ozone has been absorbed for the cleavage of one double bond. The solution is swept out with oxygen and the mixture is dropped slowly into hot water. After steam distillation of the volatile materials the residue is extracted with ether, washed with dilute sodium hydroxide solution and then with water to neutrality. The ether solution is dried over anhydrous sodium sulfate, filtered and evaporated under vacuum. The residue is extracted with 800 parts of ethanol. Evaporation of the extract yields the crude 1-benzoyloxymethyl-1,12-dimethyl - 1,2,3,4,5,6,7,9,10,11,12,13-dodecahydro-7-phenanthrone. The latter is dissolved in 900 parts of ethanol and then treated with 50 parts of semicarbazide hydrochloride and 50 parts of sodium acetate in 900 parts of 50% methanol solution. After heating at reflux temperature for 20 minutes 40% of the solvent is removed and the residue added to 2000 parts of water. The precipitated semicarbazone of 1-benzoyloxymethyl-1,12 - dimethyl - 1,2,3,4,5,6,7,9,10,11,12,13-dodecahydro-7-phenanthrone is collected on a filter, washed with water and dried in vacuo. Crystallization from 80% methanol yields crystals melting at about 233–235° C. The compound has the structural formula

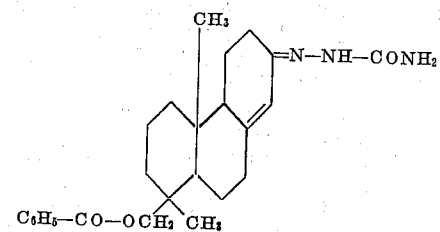

Example 6

A solution of 215 parts of 1-benzoylmethyl-1,12-dimethyl - 1,2,3,4,5,6,7,9,10,11,12,13-dodecahydro-7-phenanthrone semicarbazone in 300 parts of acetic acid is treated with 7 parts of 50% pyruvic acid and 8 parts of sodium acetate in 40 parts of acetic acid. The resulting solution is heated to reflux temperature for 10 minutes. 1000 parts of water are added at such a rate that the reflux temperature is maintained at 105–110° C. for 25 minutes reaction time, then at 100–105° C. for 15 minutes and finally at 95–100° C. for 20 minutes. After cooling to room temperature the mixture is extracted with ether and the extract is washed free of acid with sodium hydroxide and then with water to neutrality. The ether solution is dried over anhydrous sodium sulfate, filtered, and concentrated in vacuo. The residue is redissolved in 10 parts of anhydrous ether and 10 parts of petroleum ether are added. A solid separates which is redissolved in ether and reprecipitated by slow addition of petroleum ether. The precipitate is collected on a filter, and washed with 2 parts of anhydrous ether. The resulting 1-benzoyloxymethyl - 1,12 - dimethyl - 1,2,3,4,5,6,7,-9,10,11,12,13-dodecahydro-7-phenanthrone melts at about 132–134° C. Its infrared spectrum shows maxima at about 5.82, 6.05, 7.82 and 8.92 microns. The compound has the structural formula

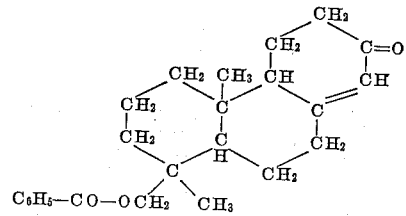

Example 7

To a solution of 24 parts of 1-hydroxymethyl-1,12 - dimethyl - 1,2,3,4,5,6,7,9,10,11,12,13 - dodecahydro-7-phenanthrone in 195 parts of dry pyridine are added 24 parts of benzoyl chloride. After standing at room temperature for an hour the mixture is diluted with 7000 parts of ether. The ether solution is decanted from the insoluble pyridinium salts, washed successively with water, 0.5-N sodium hydroxide, 10% hydrochloric acid solution and again with water, dried over anhydrous sodium sulfate and evaporated in vacuo. The residue is crystallized by dissolving in ether and addition of petroleum ether. The 1-benzoyloxymethyl - 1,12 - dimethyl-1,2,3,4,5,6,7,9,10,11,-12,13 - dodecahydro - 7 - phenanthrone melts at about 132–134° C. A mixed melting point test with the product of the preceding example shows no depression. The semicarbazone melts at about 232–235° C.

Example 8

A solution of 16 parts of neoabietinol in 50 parts of pyridine is treated with 81 parts of acetyl chloride. The mixture becomes warm and on standing at room temperature for 3 hours a crystalline deposit forms. After dilution with 280 parts of anhydrous ether the pyridine is washed out with water and the ether layer is washed successively with dilute potassium carbonate solution, water, saturated boric acid solution and again with water. After drying over anhydrous calcium sulfate, the ether solution is filtered and the filtrate is concentrated in vacuo at 20–25° C. The residual oil is dissolved in methanol and the neoabietinol acetate is precipitated by addition of 2-propanol.

40.5 parts of this ester are dissolved in 270 parts of dichloromethane and ozone is passed through the solution at —50° C. in the course of one half hour until a sufficient amount of ozone has been absorbed for the cleavage of one double bond. The solution is swept out with oxygen and the mixture is dropped into hot water. After steam distillation of the volatile materials the residue is extracted with ether, washed with dilute potassium hydroxide solution and then with water to neutrality. The ether extract is then dried over anhydrous calcium sulfate, filtered and evaporated in vacuo. The residue is extracted with ethanol and the extract is evaporated to yield crude 1-acetoxymethyl-1,12-dimethyl-1,2,3,4,5,6,-7,9,10,11,12,13 - dodecahydro - 7 - phenathrone. Purification by way of the semicarzazone as described for the case of the 1-benzoyloxymethyl compound above yields an oil which distills at about 147–148° C. at 0.04 mm. pressure. Infrared maxima are observed at 5.82, 6.05 and 7.95 millimicrons. The compound has the structural formula

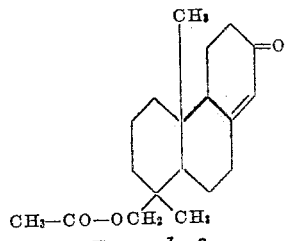

Example 9

Esterification of 16 parts of neoabietinol with 95 parts of propionyl chloride and ozonolysis of the propionate by the method of the preceding example yields the 1-propionoxymethyl-1,12-dimethyl - 1,2,3,4,5,6,7,9,10,11,12,13 - dodecahydro-7-phenanthrone which is distilled at about 150–155° C. and 0.04 mm. pressure. Infrared maxima are observed at 5.73 and 6.05 millimicrons. The compound has the structural formula

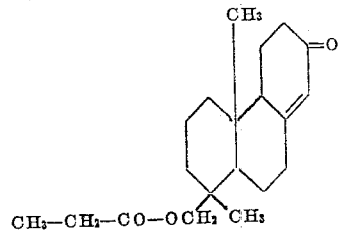

I claim:
1. A compound of the structural formula

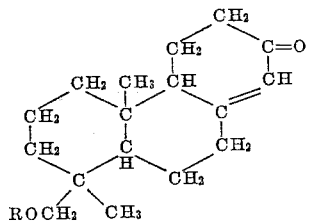

wherein R is a member of the class consisting of hydrogen, (lower alkyl)-CO— and benzoyl radicals.

2. A compound of the structural formula

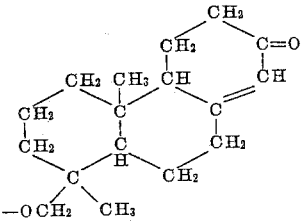

3. A compound of the structural formula

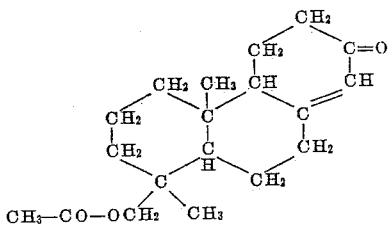

4. A compound of the structural formula

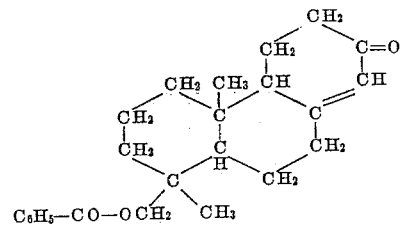

5. A compound of the structural formula

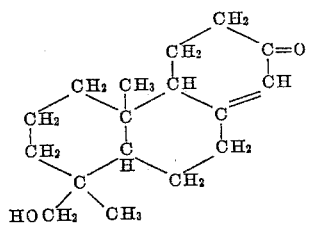

No references cited.